(12) United States Patent
Despande

(10) Patent No.: US 7,698,273 B2
(45) Date of Patent: Apr. 13, 2010

(54) SOLVING TABLE LOCKING PROBLEMS ASSOCIATED WITH CONCURRENT PROCESSING

(75) Inventor: Harshawardhan Madhukar Despande, Pune (IN)

(73) Assignee: Microsoft Corporation, Redmond, WA (US)

( * ) Notice: Subject to any disclaimer, the term of this patent is extended or adjusted under 35 U.S.C. 154(b) by 93 days.

(21) Appl. No.: 11/502,713

(22) Filed: Aug. 11, 2006

(65) Prior Publication Data

US 2007/0299843 A1 Dec. 27, 2007

(51) Int. Cl.
*G06F 17/30* (2006.01)
(52) U.S. Cl. .............................. 707/8; 707/2
(58) Field of Classification Search .............. 707/2, 707/8
See application file for complete search history.

(56) References Cited

U.S. PATENT DOCUMENTS

| 4,961,134 | A | * | 10/1990 | Crus et al. .................. 707/8 |
| 5,485,607 | A | | 1/1996 | Lomet et al. |
| 5,717,919 | A | * | 2/1998 | Kodavalla et al. .............. 707/8 |
| 5,950,199 | A | * | 9/1999 | Schmuck et al. ................ 707/8 |
| 5,956,734 | A | * | 9/1999 | Schmuck et al. ............. 707/205 |
| 5,987,477 | A | * | 11/1999 | Schmuck et al. ............. 707/201 |
| 6,240,413 | B1 | | 5/2001 | Learmont |
| 6,304,873 | B1 | | 10/2001 | Klein et al. |
| 6,418,438 | B1 | | 7/2002 | Campbell |
| 6,457,021 | B1 | * | 9/2002 | Berkowitz et al. .......... 707/201 |
| 6,606,626 | B1 | * | 8/2003 | Ponnekanti .................... 707/8 |
| 6,754,656 | B1 | * | 6/2004 | Cornwell et al. ............... 707/8 |
| 6,772,154 | B1 | | 8/2004 | Daynes et al. |
| 6,792,432 | B1 | * | 9/2004 | Kodavalla et al. ......... 707/103 R |
| 6,886,012 | B1 | * | 4/2005 | Phoenix et al. ................. 707/8 |
| 6,922,694 | B2 | | 7/2005 | Daynes |
| 6,950,834 | B2 | * | 9/2005 | Huras et al. ................. 707/202 |
| 6,993,523 | B1 | * | 1/2006 | Mende, Jr. ..................... 707/8 |
| 2002/0091694 | A1 | | 7/2002 | Hrle et al. |
| 2004/0199512 | A1 | | 10/2004 | Cornwell et al. |
| 2004/0205066 | A1 | * | 10/2004 | Bhattacharjee et al. ......... 707/8 |
| 2005/0138375 | A1 | | 6/2005 | Sadjadi |
| 2005/0234989 | A1 | | 10/2005 | Bailey et al. |
| 2006/0020598 | A1 | * | 1/2006 | Shoolman et al. .............. 707/8 |
| 2006/0123004 | A1 | * | 6/2006 | Rapp ............................ 707/8 |

OTHER PUBLICATIONS

Mohan, C., "ARIES/KVL: A Key-Value Locking Method for Concurrency Control of Multiaction Transactions Operating on B-Tree Indexes," Proceedings of the 16th VLDB Conference, Brisbane, Australia, Aug. 1990, http://www.diku.dk/undervisning/2003f/729/papers/ariesKVL.pdf.
Ponnekanti, N., "Pseudo Column Level Locking," IEEE 2001, http://ieeexplore.ieee.org/search/wrapper.jsp?arnumber=914868.
Chakrabarti et al., "Efficient Concurrency Control in Multidimensional Access Methods," ACM 1999, http://delivery.acm.org/10.1145/310000/304185/p25-chakrabarti.pdf?key1=304185&key2=3190229311&coll=GUIDE&dl=GUIDE&CFID=67736251&CFTOKEN=78670000.

* cited by examiner

*Primary Examiner*—Don Wong
*Assistant Examiner*—Kim T Nguyen
(74) *Attorney, Agent, or Firm*—Marshall, Gerstein & Borun LLP

(57) ABSTRACT

Stored pages in an electronic database are re-ordered such that the data that is being requested by multiple processes is re-ordered to be spread over several different pages such that a lock on a first page will no longer lock processes from data on the locked page.

17 Claims, 5 Drawing Sheets

| Page 1 | Page 2 | Page 3 | Page 4 |
|--------|--------|--------|--------|
| A | E | I | M |
| B | F | J | N |
| C | G | K | O |
| D | H | L | P |

425 — 405, 410, 415, 420

| Page 1 | Page 2 |
|--------|--------|
| Item A transaction 1 | |
| Item B transaction 1 | |
| Item C transaction 1 | |
| Item D transaction 1 | |

| Page 1 | Page 2 | Page 3 | Page 4 |
|---|---|---|---|
| A | B | C | D |
| E | F | G | H |
| I | J | K | L |
| M | N | O | P |

| Page 1 | Page 2 | Page 3 | Page 4 |
|---|---|---|---|
| Item A transaction 1 | Item B transaction 1 | Item C transaction 1 | Item D transaction 1 |

FIG. 5

SOLVING TABLE LOCKING PROBLEMS ASSOCIATED WITH CONCURRENT PROCESSING

BACKGROUND

Databases hold data in tables. The tables are made up of pages of data where a page of data is determined to be a useful size to be loaded into memory and operated upon without being so large that it slows down the system. The pages store keys of data and processes often operate on the keys data.

A common issue is that multiple processes attempt to access the same data at the very same time. To prevent corruption of data, a particular piece of data may be locked such that only one process may operate on the piece of data at a time. While this prevents data corruption, it slows processing as the second process has to wait for the first process to finish operating on the data.

In a large, high throughput database, the problem may be even more complicated. Under some circumstances like memory optimization or imperfect index matching, etc., the database may attempt to put a page lock along with a row lock or just put a page lock without putting on a row lock. As a result, the system may become so overwhelmed that entire pages of the table in the database may be locked. This means every piece of data on the locked page cannot be accessed until the page lock is released. Entire page locking can have negative performance effects.

SUMMARY

A method and database design is disclosed to minimize the problems associated with page locking. In the method, pages are re-ordered such that the data that is being requested by multiple processes is re-ordered to be spread over several different pages such that a lock on a first page will no longer lock processes from data on the locked page. The method may select every nth key from a table and store it in a new table until all the elements in the table are stored in the new re-ordered table. The value of n may be referred to as the selection gap value and may be one greater than the number of processes attempting to access a page. The selection gap value also may be adjusted to attempt to find the selection gap value that results in the minimum page locks overall or for a given application.

DRAWINGS

FIG. 4 is a graphical illustration of a data stored in a database; and

FIG. 5 is a graphical illustration of data stored in the database after being re-sorted.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
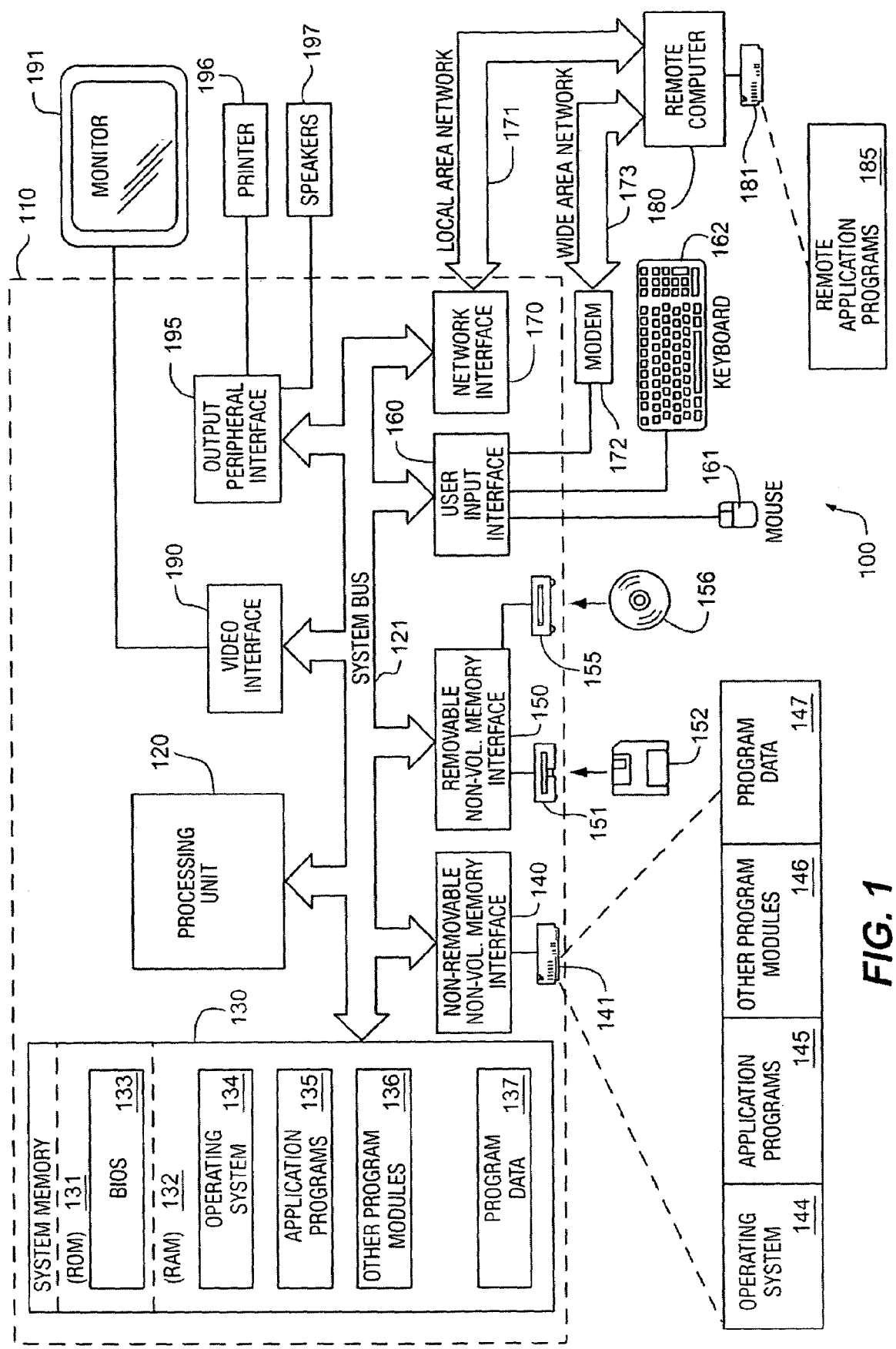
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
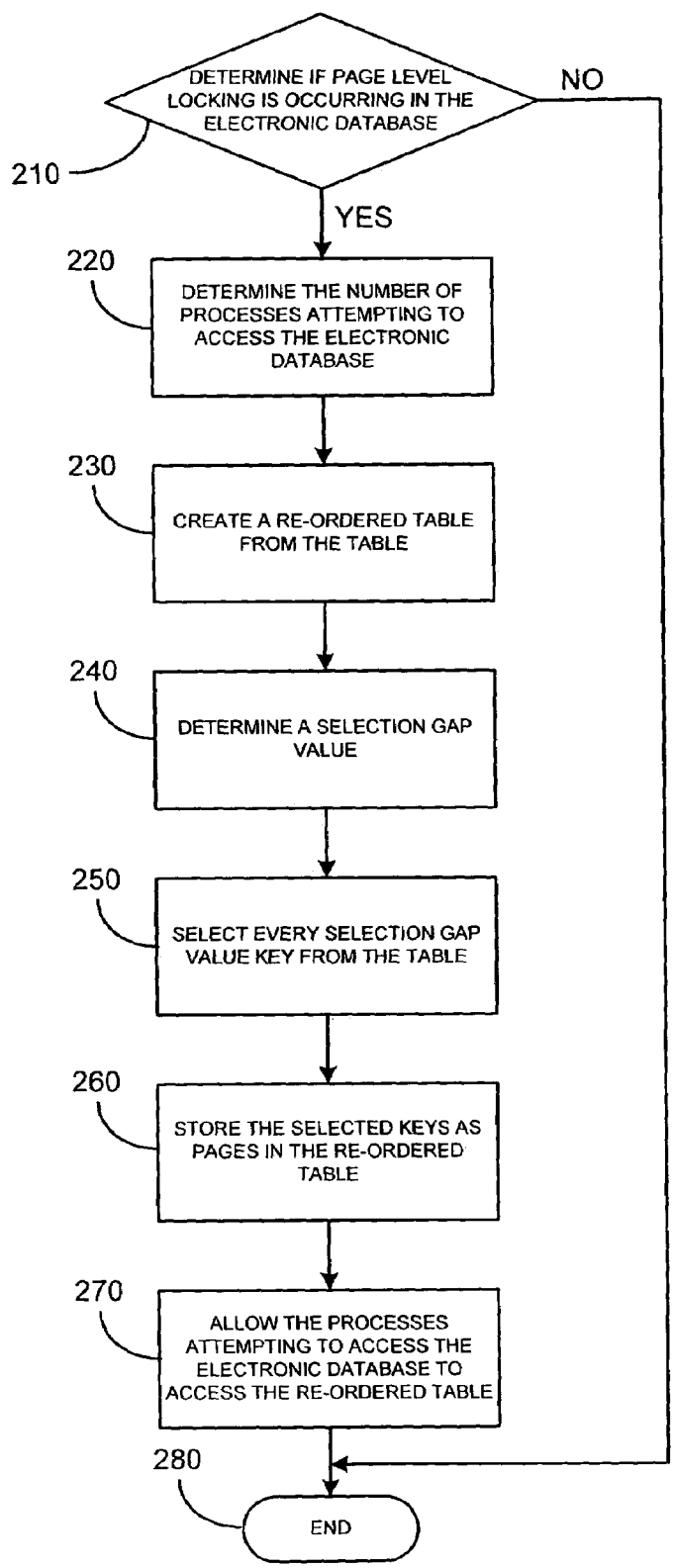
FIG. 2 is an illustration of a flowchart in accordance with the method.

FIG. 2 may be an illustration of a method of preventing table locking problems in an electronic database used by the computing system described in FIG. 1. Databases are well known. In general, databases are made up of one or more tables and tables contain keys which may be thought of as names given to data. The keys are stored in pages where pages are a collection of keys and related data of a predetermined size. The ideal size of pages is the subject of complex calculations but in general, the size is such that sufficient data can be quickly loaded but not so large that the loading process takes an extended period of time.

Processes often operate on the key data. A common issue is that multiple processes attempt to access the same key data at the very same time. To prevent corruption of data, a particular piece of data may be locked such that only one process may operate on the piece of data at a time. While this prevents data corruption, it slows processing as the second process has to wait for the first process to finish operating on the data. In a large, high throughput database, the problem may be even more complicated. Instead of individual pieces of data being locked, the system may become so overwhelmed that entire pages of the table in the database may be locked. This means every piece of data on the locked page cannot be accessed until the page lock is released. Entire page locking can have negative performance effects as relatively large amounts of data may become locked.

At block 210, the method may determine whether page level locking is occurring in the electronic database. FIG. 4 may be an illustration a sample database table 400. The table may have pages which may be viewed as vertical columns 405, 410, 415 and 420. If a first process attempts to access key A (425), key A (425) will become locked such that other processes cannot modify key A (425) until the first process is finished with key A (425). Such a lock may be referred to as a row level lock. Under certain circumstances, the memory may not be able to hold all the row level locks that are in place at one time. In these circumstances, the system may lock the entire page of data. For example, the entire column 405 may be locked including keys A, B, C and D. A page lock may relieve memory but may cause delayed processing as entire pages of data may be locked. Determining whether page locking is occurring may be accomplished by executing processes against two consecutive keys and determining whether both processes are permitted to execute or whether one process is forced to wait on another process.

If at block 210 it is determined that page level locking is occurring, at block 220, the method may determine the number of processes attempting to access the electronic database. This may be accomplished by examining the threads calling on the page of data in question and counting the threads. For example, in FIG. 4, there may be four processes accessing page 1 (405), specifically, processes 430, 435, 440 and 445. Control may then pass to block 230.

At block 230, the method may create a re-ordered table from the table. At block 240, the re-ordered table may be created by determining a selection gap value where the selection gap value is at least one greater than the number of processes attempting to access the electronic database. In other words, the method may select every nth key from the table where n is a number that also is known as the selection gap value. For example, the selection gap value may be five which indicates every fifth element may be selected and which may be one more than the four processes attempting to execute processes (430, 435, 440 and 445) on Page 1. By making the selection gap value at least one greater than the number of processes, the database may be re-order in such a manner that the desired keys will be spread over a number of pages thereby resulting in no or fewer page conflicts At block 250, the method may select every selection gap value key from the table. In other words, the method may select every nth key from the table where n is a number that also is known as the selection gap value. For example, the selection gap value may be five which indicates every fifth element will be selected until all the elements of the table are selected.

At block 260, the method may store the selected keys as pages in the re-ordered table until all the keys have been selected. FIG. 5 may be an illustration of a table 505 that results when a selection gap value of five is applied to the table in FIG. 4. For example, in FIG. 4, page 1 (405) contained A, B, C, and D. After being re-ordered, in FIG. 5, page 1 (510) in the re-ordered table contains A, E, I and M. In another embodiment, only the pages that are subject to locks are re-ordered.

At block 270, the method may allow the processes attempting to access the electronic database to access the re-ordered table. Referring to FIG. 4, the transaction for key A 435 and the transaction for key B 440 both access page 1. Assuming page locking is occurring, the transaction for key B 440 will have to wait for the transaction for key A 435 to complete. As illustrated in FIG. 5, the transaction for key A 515 now accesses page 1 510 of the re-ordered table 505 and the transaction for key B 520 now accesses page 2 525 with neither transaction being locked by page locks. At block 280, the method may end.

Figure 3:
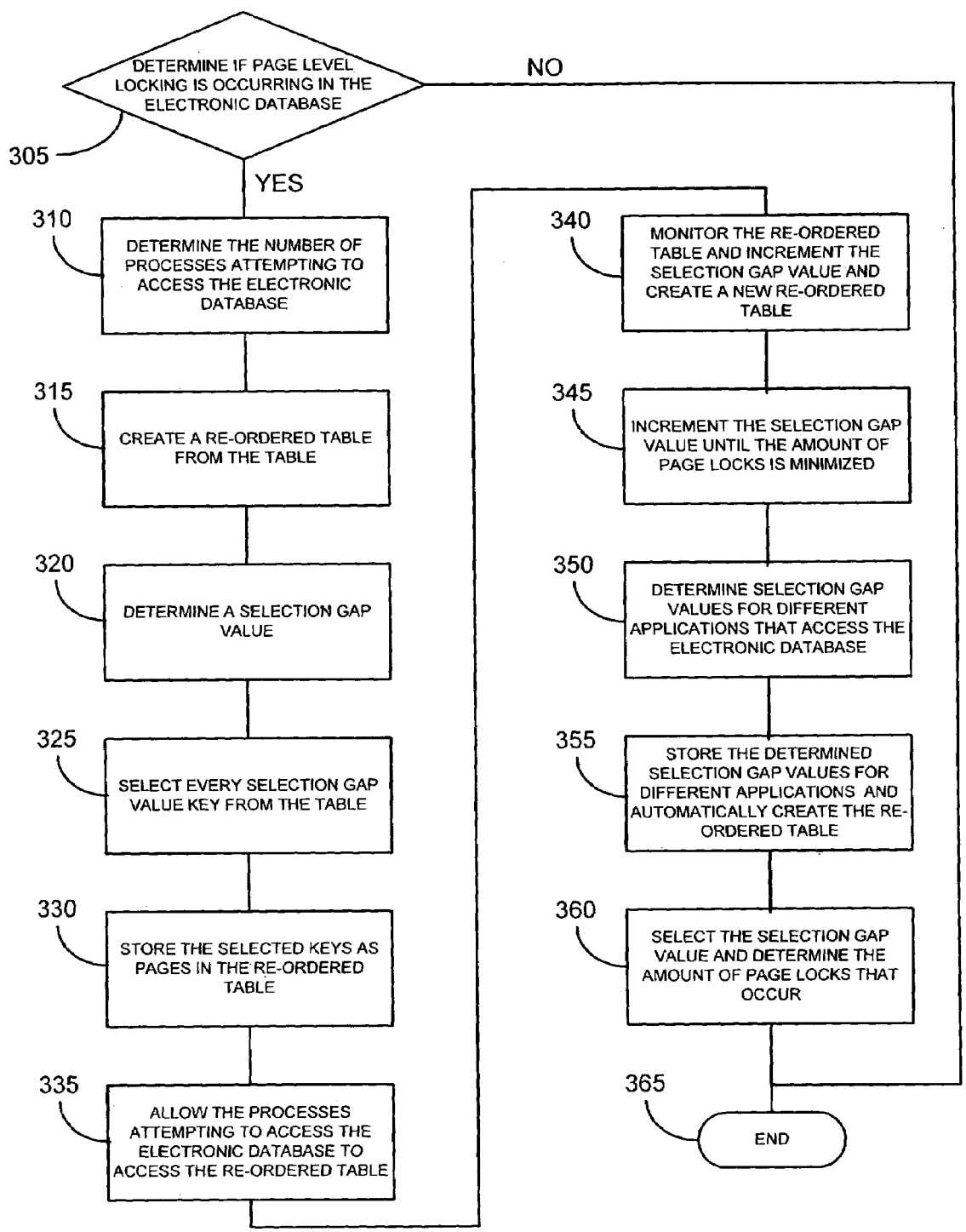
FIG. 3 is another illustration of a flowchart in accordance with the method.

FIG. 3 may be another illustration of a method in accordance with the claims. Blocks 305 through blocks 335 may be the same as blocks 210 through 270. At block 340, the method may monitor the re-ordered table and if page locking is detected, the selection gap value may be incremented and a new re-ordered table may be created. The incrementation may be up or down and may be by any value. At block 345, the method may repeatedly increment the selection gap value until the amount of page locks is minimized. For example, it may not be possible to totally eliminate page locks. However, by experimentation, it may be possible to find a selection gap value that results in the minimum number of page locks.

At block 350, the method may determine selection gap values for different applications that access the electronic database such that the amount of page locks is minimized for each specific application. For example, some applications may access a random selection of data and page locks may not be an issue. Other applications may make repeated queries of data that is located on the same page where page locks might be very common. The ideal selection gap value may be different for specific applications and may be different for different modules within the same specific application.

At block 355, the method may store the determined selection gap values for different applications that access the electronic database and may automatically create the re-ordered table using the stored selection gap value when the application is started. In a similar manner, when specific modules within an application are opened, the method may automatically use the previously determined selection gap value At block 360, the method may randomly select the selection gap value and determine the amount of page locks that occur until a minimum number of page locks occurs. In this way, the method may be able to more rapidly determine the ideal selection gap value rather than incrementing through numerous values.

In another embodiment, the method may scan the data to locate keys that are not in the same page. By locating keys that are not on the same page, only those keys that are on the same page may have to be re-ordered and keys that already on separate pages may not need to be re-ordered. This method may be executed by determining what page each of the keys is located, comparing the pages and re-ordering the pages that contain more than one key.

In practice, the method may be useful in a variety of situations. As just one example, an enterprise resource program ("ERP") may be used by an entire organization and may have high demands placed on the underlying database. By implementing the described method, page locks may be avoided which may result in improved performance of the ERP system. In addition, the underlying database may be optimized to select a selection gap value that results in the fewest number of page locks for each module of the ERP system.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method of preventing table locking problems in an electronic database wherein the database comprises a table that contains keys where keys are stored in pages comprising:
   determining whether page level locking is occurring in the electronic database;
   if page level locking is occurring, determining the number of processes attempting to access the electronic database;
   creating a re-ordered table from the table comprising:
      determining a selection gap value where the selection gap value is at least one greater than the number of processes attempting to access the electronic database;
      selecting every selection gap value key from the table;
      storing the selected keys as pages in the re-ordered table until all the keys have been selected;
   allowing the processes attempting to access the electronic database to access the re-ordered table; and
   monitoring the re-ordered table and if page locking is detected, incrementing the selection gap value and creating a new re-ordered table.

2. The method of claim 1, further comprising only re-ordering the pages of the table that are locked.

3. The method of claim 1, further comprising repeatedly incrementing the selection gap value until the amount of page locks is minimized.

4. The method of claim 3, further comprising determining selection gap values for different applications that access the electronic database such that the amount of page locks is minimized for each specific application.

5. The method of claim 4, further comprising storing the determined selection gap values for different applications that access the electronic database and automatically creating the re-ordered table using the stored selection gap value when the application is started.

6. The method of claim 1, further comprising randomly selecting the selection gap value and determining the amount of page locks that occur until a minimum number of page locks occurs.

7. An electronic database stored on a computer storage medium designed to minimize table locking problems caused by multiple processes accessing the database comprising:
   a table that contains keys;
   a plurality of pages that store keys;
   a re-ordered table that stores the keys in a new order by using a selection gap value to select every selection gap value key from the table such that page locks are minimized wherein the selection gap value is adjusted until the amount of page locks is minimized; and
   an electronic database interface that allows the multiple processes to access the re-ordered table.

8. The electronic database of claim 7, wherein the re-ordered table comprises pages of the table that were locked.

9. The electronic database of claim 7 wherein the selection gap values for different applications is determined such that the amount of page locks is minimized for each specific application.

10. The electronic database of claim 9, wherein the re-ordered table is automatically created using the stored selection gap value when the application is started.

11. The electronic database of claim 7, wherein the selection gap value is randomly selected until a minimum number of page locks occurs.

12. A computer storage medium comprising computer executable instructions for preventing table locking problems in an electronic database wherein the database comprises a table that contains keys where keys are stored in pages comprising:
   computer executable instructions for determining whether page level locking is occurring in the electronic database;
   if page level locking is occurring, computer executable instructions for determining the number of processes attempting to access the electronic database;
   computer executable instructions for creating a re-ordered table from the table comprising:
      computer executable instructions for determining a selection gap value where the selection gap value is at least one greater than the number of processes attempting to access the electronic database;
      computer executable instructions for selecting every selection gap value key from the table;
      computer executable instructions for storing the selected keys as pages in the re-ordered table until all the keys have been selected;
   computer executable instructions for allowing the processes attempting to access the electronic database to access the re-ordered table, and
   computer executable instructions for monitoring the re-ordered table and if page locking is detected, incrementing the selection gap value and creating a new re-ordered table.

13. The computer storage medium of claim 12, further comprising computer executable instructions for only re-ordering the pages of the table that are locked.

14. The computer storage medium of claim 13, further comprising computer executable instructions for repeatedly incrementing the selection gap value until the amount of page locks is minimized.

15. The computer storage medium of claim 14, further comprising computer executable instructions for determining selection gap values for different applications that access the electronic database such that the amount of page locks is minimized for each specific application.

16. The computer storage medium of claim 15, further comprising computer executable instructions for storing the determined selection gap values for different applications that access the electronic database and automatically creating the re-ordered table using the stored selection gap value when the application is started.

17. The computer storage medium of claim 12, further comprising computer executable instructions for randomly selecting the selection gap value and determining the amount of page locks that occur until a minimum number of page locks occurs.

* * * * *

UNITED STATES PATENT AND TRADEMARK OFFICE
CERTIFICATE OF CORRECTION

| | |
|---|---|
| PATENT NO. | : 7,698,273 B2 |
| APPLICATION NO. | : 11/502713 |
| DATED | : April 13, 2010 |
| INVENTOR(S) | : Harshawardhan Madhukar Despande |

It is certified that error appears in the above-identified patent and that said Letters Patent is hereby corrected as shown below:

In column 8, line 5, in Claim 9, delete "claim 7" and insert -- claim 7, --, therefor.

Signed and Sealed this
First Day of February, 2011

David J. Kappos
*Director of the United States Patent and Trademark Office*